L. F. C. HAAS.
DETACHABLE TREAD FOR PNEUMATIC TIRES.
APPLICATION FILED MAY 13, 1911.
1,090,145.
Patented Mar. 17, 1914.
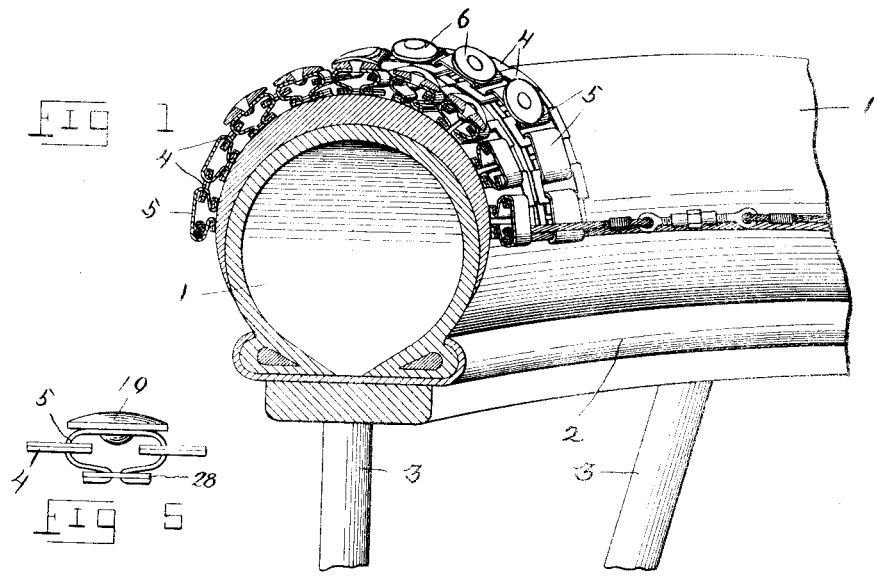
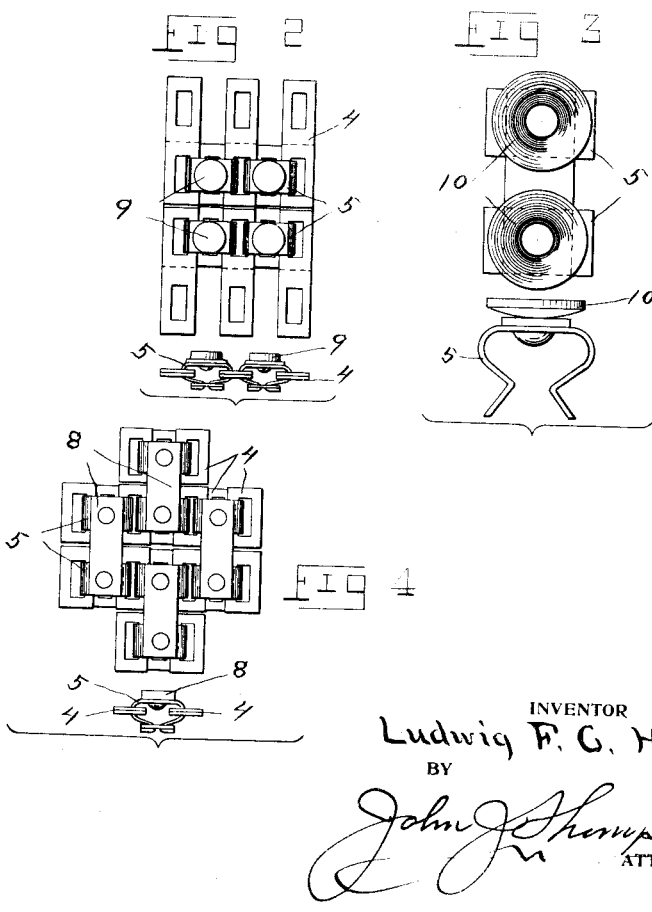
WITNESSES
B. O. Faltin
M. L. Lefevre.
INVENTOR
Ludwig F. C. Haas,
BY
John J. Thompson
ATTORNEY

UNITED STATES PATENT OFFICE.

LUDWIG F. C. HAAS, OF LANCASTER, PENNSYLVANIA.

DETACHABLE TREAD FOR PNEUMATIC TIRES.

1,090,145. Specification of Letters Patent. Patented Mar. 17, 1914.

Application filed May 13, 1911. Serial No. 626,990.

*To all whom it may concern:*

Be it known that I, LUDWIG F. C. HAAS, a citizen of the United States, residing at Lancaster, in the county of Lancaster and State of Pennsylvania, have invented certain new and useful Improvements in Detachable Treads for Pneumatic Tires, of which the following is a specification, reference being had therein to the accompanying drawing.

This invention relates to a detachable tread for pneumatic tires, and of that class which is intended to prevent puncture, blowouts, etc., and to prolong the life of the tire.

The object of the invention is to provide a tread, that while it is detachable, shall be so secured upon the tire that it becomes a semi-permanent protector.

Another object of the invention being to produce a tread that shall be flexible, and at the same time be closely enough woven to deflect nails and other pointed objects.

Still another object of the invention is to construct a tread that shall be durable, cheap and efficient; be easily applied and repaired or removed.

With these and other objects in view, my invention consists in certain construction and combination of parts as will hereinafter be fully described and claimed in the annexed specification and illustrated in the accompanying drawings, which form a part of this application and in which like figures of reference refer to corresponding parts in all of the views; but it is fully understood that while I have here described my invention as shown, that I do not confine myself to the exact design, as slight changes may be made in the construction and arrangement of the several parts without departing from the spirit of the invention.

In the drawings:—Figure 1, is a perspective view of a portion of a tire and wheel shown in section, and with my device applied thereto. Fig. 2, shows another form of link. Fig. 3, shows still another form of link, as do Figs. 4, and 5.

Referring to the drawings:—The usual pneumatic tire is indicated by the numeral 1, the wheel rim by 2, and the spokes by 3.

As shown in Fig. 1, the detachable tread comprises the links 4, which are lapped upon each other and held together by the cross or wearing links 5. Such of said wearing links 5, as come upon the center or tread of the tire are provided with the case hardened or otherwise treated knobs or heads 6; and as shown in Figs. 2, 3, 4, 5, these heads may be of various forms, such as the plate 8, as shown in Fig. 4 which binds two or more links 5, together, or the knobs 9, and 10, shown in Figs. 2 and 3.

The links are substantially flat and in cross section resemble an S and an inverted S joined together. The lower bends of the links pass through an opening in a plate 28 which thus prevents the ends from spreading. It will be noticed that by my construction there is no wear and tear on the tread of the tire as the lower portions of the links afford a flat bearing surface against the same, and that there are no joints on the upper surfaces of the links that could be spread by the strain put upon them.

For retaining the device upon the tire 1, there is provided the binder or attaching cable 11, which is threaded through the outer links 5, upon each side of the tire; each cable 11, making two complete wraps, and having its ends extending outside of the links for a short distance and secured together by a turnbuckle or other securing means, which may be readily loosened to remove the tread, and yet securely hold the links down back of the securing portion.

While I have only illustrated a portion of the tread, it is understood that the same extends entirely around the wheel and is endless.

Having thus described my invention what I claim as new and desire to secure by Letters Patent is:—

A tread for automobile tires providing a series of substantially flat links, resembling in cross section an S and inverted S connected together, plates provided with an opening for engaging the lower bends of the links whereby the latter are prevented from spreading, plates secured on various links to form the tread, means for connecting said links together and cables threaded for adjustment through the outer links whereby the whole device may be tightened on a tire, said links presenting a substantially flat bearing surface to the tire.

In testimony whereof I affix my signature in presence of two witnesses.

LUDWIG F. C. HAAS.

Witnesses:
  JOHN J. THOMPSON,
  MABEL L. LEFEVRE.